United States Patent
Ledlie et al.

(10) Patent No.: US 9,198,154 B2
(45) Date of Patent: Nov. 24, 2015

(54) METHOD AND APPARATUS FOR CONSTRUCTING A USER-GENERATED GEOGRAPHICAL SYSTEM

(75) Inventors: Jonathan Ledlie, Cambridge, MA (US); Jamey Hicks, Newton, MA (US); Einat Minkov, Cambridge, MA (US); Jun-geun Park, Cambridge, MA (US); Dorothy W. Curtis, Framingham, MA (US); Benjamin Charrow, Chicago, IL (US); Seth J. Teller, Cambridge, MA (US); Jonathan Battat, Los Angeles, CA (US)

(73) Assignees: Massachusetts Institute of Technology, Cambridge, MA (US); Nokia Corporation, Espoo (FI)

( * ) Notice: Subject to any disclaimer, the term of this patent is extended or adjusted under 35 U.S.C. 154(b) by 394 days.

(21) Appl. No.: 12/965,762

(22) Filed: Dec. 10, 2010

(65) Prior Publication Data

US 2011/0306354 A1    Dec. 15, 2011

Related U.S. Application Data

(60) Provisional application No. 61/285,454, filed on Dec. 10, 2009.

(51) Int. Cl.
*H04W 4/02* (2009.01)
*H04W 64/00* (2009.01)
*G01S 5/02* (2010.01)

(52) U.S. Cl.
CPC ............. *H04W 64/00* (2013.01); *G01S 5/0252* (2013.01)

(58) Field of Classification Search
CPC .... H04W 64/00; H04W 4/021; H04W 64/006
See application file for complete search history.

(56) References Cited

U.S. PATENT DOCUMENTS

| | | | | | |
|---|---|---|---|---|---|
| 6,101,390 | A | * | 8/2000 | Jayaraman et al. | 455/456.1 |
| 8,169,982 | B2 | * | 5/2012 | Gogic et al. | 370/338 |
| 2007/0021126 | A1 | * | 1/2007 | Nanda et al. | 455/456.1 |
| 2007/0060130 | A1 | | 3/2007 | Gogic et al. | |
| 2007/0243869 | A1 | * | 10/2007 | Kwon et al. | 455/435.1 |
| 2008/0261614 | A1 | * | 10/2008 | Mia et al. | 455/456.1 |

(Continued)

FOREIGN PATENT DOCUMENTS

CN    1977563 A    6/2007

OTHER PUBLICATIONS

International Search Report and Written Opinion, received in corresponding Patent Cooperation Treaty Application No. PCT/IB2010/055760, Dated Apr. 7, 2011. 12 pages.

(Continued)

*Primary Examiner* — Nathan Mitchell
*Assistant Examiner* — Frank Donado
(74) *Attorney, Agent, or Firm* — Alston & Bird LLP

(57) ABSTRACT

A method and apparatus are provided to permit location discovery, including location discovery in indoor settings. The method may identify a wireless fingerprint present at a geographical location and determine whether the wireless fingerprint corresponds to a previously observed wireless fingerprint associated with the predefined geographical location. A new wireless fingerprint and a geographical location, or bind, may be received by the system and the system may evaluate whether or not the new bind is erroneous or not, or if the new bind is an improvement over existing binds in determining whether or not to accept the new bind.

15 Claims, 11 Drawing Sheets

(56) References Cited

U.S. PATENT DOCUMENTS

| | | | | |
|---|---|---|---|---|
| 2008/0274752 | A1* | 11/2008 | Houri | 455/456.1 |
| 2008/0299969 | A1* | 12/2008 | Shatsky | 455/435.1 |
| 2009/0043504 | A1* | 2/2009 | Bandyopadhyay et al. | 701/213 |
| 2011/0130135 | A1* | 6/2011 | Trigui | 455/423 |
| 2012/0202521 | A1* | 8/2012 | Shkedi | 455/456.1 |

OTHER PUBLICATIONS

Bhasker, Ezekiel S, "Employing User Feedback for Fast, Accurate, Low-Maintenance Geolocationing". Proceedings of the Second IEEE Annual Conference on Pervasive Computing and Communications, 2004. pp. 111-120. Mar. 14-17, 2004.

Bolliger, Philipp, "Redpin-Adaptive, Zero-Configuration Indoor Localization through User Collaboration", Proceedings of the Annual International Conference on Mobile Computing and Networking, Sep. 19, 2008, San Francisco. Abstract; Chapters 3.2.

Teller, Seth, "Organic Indoor Location Discovery". Technical Report CSAIL TR-2008-075, Massachusetts Institute of Technology, Dec. 30, 2008. Abstract; Chapters 4.1.

Bhaskar, Ezekiel S., et al., "Employing User Feedback for Fast, Accurate, Low-Maintenance Geolocationing", Mar. 2004, 10 pages.

Bolliger, Philipp, "Redpin-Adaptive, Zero-Configuration Indoor Localization through User Collaboration", MELT 08, Sep. 19, 2008, pp. 55-60.

Barry, Andrew, et al, "A Long-Duration Study of User-Trained 802.11 Localization", MELT 2009, 17 pages.

Office Action for Chinese Application No. 201080056221.0 dated Sep. 24, 2013.

Office Action for Chinese Application No. 201080056221.0 dated Apr. 2, 2014.

* cited by examiner

METHOD AND APPARATUS FOR CONSTRUCTING A USER-GENERATED GEOGRAPHICAL SYSTEM

CROSS REFERENCE TO RELATED APPLICATION

This application claims the benefit of U.S. Provisional Application No. 61/285,454, filed Dec. 10, 2009, the contents of which are incorporated herein in their entirety.

TECHNOLOGICAL FIELD

Embodiments of the present invention relate generally to computing technology and, more particularly, relate to methods and apparatus for location discovery.

BACKGROUND

Many types of computing and/or communications devices are capable of providing a wide array of functions while the devices move from place to place. Some mobile devices execute applications, such as calendars, reminders, navigation assistants, and communication tools having functionality that may be altered or enhanced depending upon the location of the mobile device.

BRIEF SUMMARY

A method, apparatus, and computer program product are therefore provided for constructing a user-generated or organic geolocation system. In general, example embodiments of the present invention provide an improvement by, among other things, providing a determination as to whether a user-supplied bind is erroneous or whether it is an improvement over existing binds, and providing a user with visual feedback on what areas of a map require more user-generated coverage in order to improve localization in those areas, and what level of accuracy to expect in those areas.

In one embodiment of the present invention, a method is provided that includes receiving a new wireless fingerprint and a corresponding geographic location that together constitute a new bind. The method may also determine whether or not the new bind should be accepted, and if so, the new bind is associated with the geographic location.

Determining whether the new bind should be accepted may include accepting the new bind if it is the only bind that corresponds to the geographic location. Determining whether the new bind should be accepted may also include accepting the new bind if adding the new bind to a database increases a current average signal distance between the geographical location and a plurality of neighbors that comprise existing binds in the database. The method may decline the new bind if adding the new bind to a database decreases the current average signal distance between the geographical location and the plurality of neighbors that comprise existing binds in the database. Determining whether to accept the new bind may also include hierarchical clustering to group the new bind with existing binds that correspond to the geographical location, and wherein more than one cluster results from the hierarchical clustering, selecting the cluster whose sum of signal distance to neighbor locations is shortest, thereby accepting the new bind if it is in the selected cluster. Determining whether to accept the new bind may also include determining, from existing binds in the database, wireless fingerprints from a plurality of spaces that neighbor the geographical location and accepting the new bind if the wireless fingerprints from the majority of spaces that neighbor the geographical location are substantially similar to the wireless fingerprint of the new bind. Accepting the new bind may include updating a Voronoi diagram such that any geographical locations that do not have an associated wireless fingerprint that are closer to the new bind than to any existing bind are associated with the new bind.

According to another embodiment of the invention, an apparatus is provided that includes at least one processor and at least one memory including computer program code. The at least one memory and the computer program code are configured to, with the at least one processor, cause the apparatus to receive a new wireless fingerprint and a corresponding geographic location that together constitute a new bind. The apparatus may be further caused to determine whether or not the new bind should be accepted, and if so, associate the new bind with the geographic location and failing to associate the new bind with the geographic location if it is declined.

The apparatus may further be caused to determine whether the new bind should be accepted by accepting the new bind if it is the only bind that corresponds to the geographic location. The new bind may be accepted if adding the new bind to a database increases a current average signal distance between the geographical location and a plurality of neighbors that comprise existing binds in the database. The new bind may be discarded if adding the new bind to a database decreases the current average signal distance between the geographical location and the plurality of neighbors that comprise existing binds in the database. The determination of whether or not the new bind should be accepted may also be performed by a hierarchical clustering to group the new bind with the existing binds that correspond to the geographical location, and wherein more than one cluster results from the hierarchical clustering, selecting the cluster whose sum of signal distance to neighbor locations is shortest, thereby accepting the new bind if it is in the selected cluster. The determination of whether to accept the new bind may also be made by determining, from existing binds in the database, wireless fingerprints from a plurality of spaces that neighbor the geographical location and accepting the new bind if the wireless fingerprints from the majority of spaces that neighbor the geographical location are substantially similar to the wireless fingerprint of the new bind. Accepting the new bind may include updating a Voronoi diagram such that any geographical locations that do not have an associated wireless fingerprint that are closer to the new bind than to any existing bind are associated with the new bind.

According to yet another embodiment of the invention, a computer program product is provided that includes at least one computer-readable storage medium having computer-executable program code instructions stored therein. The computer-executable program code instructions of this embodiment include program code instructions for receiving a new wireless fingerprint and a corresponding geographic location that together constitute a new bind. The method may also determine whether or not the new bind should be accepted, and if so, the new bind is associated with the geographic location, and failing to associate the new bind with the geographic location if it is declined.

Determining whether the new bind should be accepted may include accepting the new bind if it is the only bind that corresponds to the geographic location. Determining whether the new bind should be accepted may also include accepting the new bind if adding the new bind to a database increases a current average signal distance between the geographical location and a plurality of neighbors that comprise existing binds in the database. The program code instructions may not accept the new bind if adding the new bind to a database decreases the current average signal distance between the geographical location and the plurality of neighbors that comprise existing binds in the database. Determining whether to accept the new bind may also include hierarchical clustering to group the new bind with existing binds that correspond to the geographical location and, if more than one cluster results from the hierarchical clustering, selecting the cluster whose sum of signal distance to neighbor locations is shortest. Thereby accepting the new bind if it is in the selected cluster. Determining whether to accept the new bind may also include determining, from existing binds in the database, wireless fingerprints from a plurality of spaces that neighbor the geographical location and accepting the new bind if the wireless fingerprints from the majority of spaces that neighbor the geographical location are substantially similar to the wireless fingerprint of the new bind. Accepting the new bind may include updating a Voronoi diagram such that any geographical locations that do not have an associated wireless fingerprint that are closer to the new bind than to any existing bind are associated with the new bind.

BRIEF DESCRIPTION OF THE SEVERAL VIEWS OF THE DRAWING(S)

Having thus described embodiments of the invention in general terms, reference now will be made to the accompanying drawings, which are not necessarily drawn to scale, and wherein:

DETAILED DESCRIPTION

Figure 1:
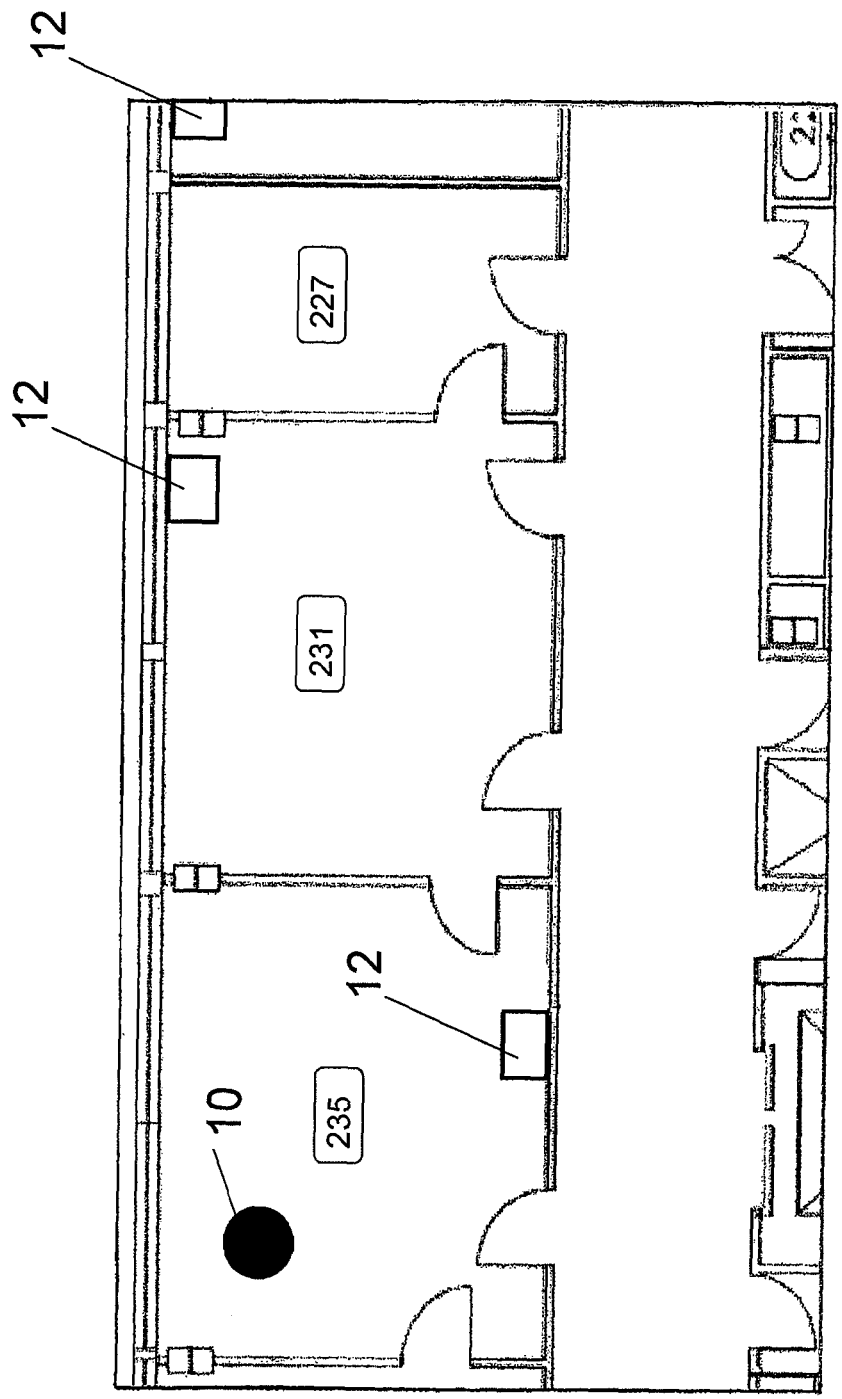
FIG. 1 is a schematic floor plan of a portion of a building illustrating a mobile device and a plurality of signal sources.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

FIG. 1 depicts the floor plan of a portion of building. As shown, the building is divided into a number of spaces by walls, doors, windows and the like. In accordance with embodiments of the present invention, a mobile device 10 within the building may advantageously determine its location, such as in terms of the room in which the mobile device is currently located. As explained below, the mobile device may identify a wireless fingerprint present at its current geographical location and, based upon this wireless fingerprint and its association with a predefined geographical location, may determine its current location to be the predefined geographical location with which the wireless fingerprint has been previously associated. By way of example, FIG. 1 depicts three wireless signal sources 12, such as access points for a wireless local area network or the like, that emit wireless signals that combine to define the wireless fingerprint detected by the mobile device in room 235.

Localization may be performed in an indoor environment through fingerprint-based localization that characterizes the spatial variation available in radio signals, such as 802.11 and cellular broadcasts and compiling this information on to a virtual map. Each mobile device can then estimate its location by identifying the space within the map whose fingerprint most closely match any fingerprint recently observed by the device. Fingerprint-based localization may be preferable over radio maps as radio maps can experience large errors indoors due to multi-path effects.

In addition to determining whether the wireless fingerprint detected by the mobile device 10 has previously been associated with a predefined geographical location, embodiments of the present invention may also permit the identification of the current location, such as via user input to the mobile device, and the subsequent association of the wireless fingerprint detected by the mobile device with the identified location, thereby permitting population of a database from which subsequent comparisons will be made. By providing both for the automatic determination of the current location based on previously observed wireless fingerprints and for user identification of the current location, the method, apparatus and computer program product of embodiments of the present invention may advantageously meld both the survey and use aspects of the location discovery technique so as to concurrently support both use of the location discovery technique and further population of a database from which subsequent comparisons will be made.

Figure 2:
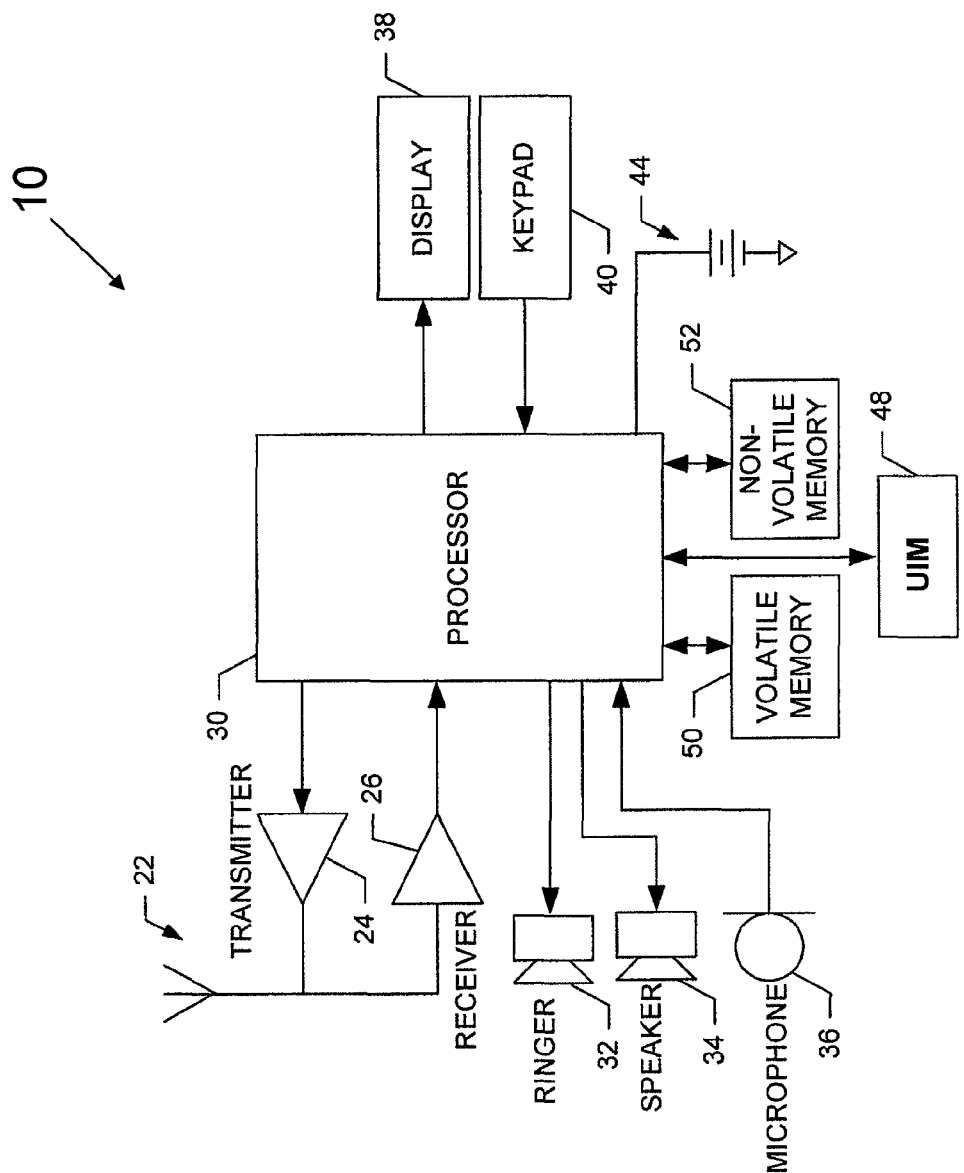
FIG. 2 is a block diagram of a mobile device, according to one embodiment of the present invention.

Although the mobile device 10 may be configured in various manners, one example of a mobile device that could benefit from embodiments of the invention is depicted in the block diagram of FIG. 2. While one embodiment of a mobile device will be illustrated and hereinafter described for purposes of example, other types of mobile devices, such as portable digital assistants (PDAs), pagers, mobile televisions, gaming devices, all types of computers (e.g., laptops or mobile computers), cameras, audio/video players, radios, or any combination of the aforementioned, and other types of mobile devices, may employ embodiments of the present invention. As described, the mobile device may include various means for performing one or more functions in accordance with embodiments of the present invention, including those more particularly shown and described herein. It should be understood, however, that a mobile device may include alternative means for performing one or more like functions, without departing from the spirit and scope of the present invention.

The mobile device 10 of the illustrated embodiment includes an antenna 22 (or multiple antennas) in operable communication with a transmitter 24 and a receiver 26. The mobile device may further include an apparatus, such as a processor 30, that provides signals to and receives signals from the transmitter and receiver, respectively. The signals may include signaling information in accordance with the air interface standard of the applicable cellular system, and/or may also include data corresponding to user speech, received data and/or user generated data. In this regard, the mobile device may be capable of operating with one or more air interface standards, communication protocols, modulation types, and access types. By way of illustration, the mobile device may be capable of operating in accordance with any of a number of first, second, third and/or fourth-generation communication protocols or the like. For example, the mobile device may be capable of operating in accordance with second-generation (2G) wireless communication protocols IS-136, global system for mobile communications (GSM) and IS-95, or with third-generation (3G) wireless communication protocols, such as universal mobile telecommunications system (UMTS), code division multiple access 2000 (CDMA2000), wideband CDMA (WCDMA) and time division-synchronous code division multiple access (TD-SCDMA), with 3.9G wireless communication protocol such as E-UTRAN (evolved-UMTS terrestrial radio access network), with fourth-generation (4G) wireless communication protocols or the like.

It is understood that the apparatus, such as the processor 30, may include circuitry implementing, among others, audio and logic functions of the mobile device 10. The processor may be embodied in a number of different ways. For example, the processor may be embodied as various processing means such as processing circuitry, a coprocessor, a controller or various other processing devices including integrated circuits such as, for example, an ASIC (application specific integrated circuit), an FPGA (field programmable gate array), a hardware accelerator, and/or the like. In an example embodiment, the processor is configured to execute instructions stored in a memory device or otherwise accessible to the processor. As such, whether configured by hardware or software methods, or by a combination thereof, the processor 30 may represent an entity capable of performing operations according to embodiments of the present invention, including those depicted in FIG. 4, while specifically configured accordingly. The processor may also include the functionality to convolutionally encode and interleave message and data prior to modulation and transmission.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

The mobile device 10 may also comprise a user interface including an output device such as an earphone or speaker 34, a ringer 32, a microphone 36, a display 38, and a user input interface, which may be coupled to the processor 30. The user input interface, which allows the mobile device to receive data, may include any of a number of devices allowing the mobile device to receive data, such as a keypad 40, a touch display (not shown) or other input device. In embodiments including the keypad, the keypad may include numeric (0-9) and related keys (#, *), and other hard and soft keys used for operating the mobile device. Alternatively, the keypad may include a conventional QWERTY keypad arrangement. The keypad may also include various soft keys with associated functions. In addition, or alternatively, the mobile device may include an interface device such as a joystick or other user input interface. The mobile device may further include a battery 44, such as a vibrating battery pack, for powering various circuits that are used to operate the mobile device, as well as optionally providing mechanical vibration as a detectable output.

The mobile device 10 may further include a user identity module (UIM) 48, which may generically be referred to as a smart card. The UIM may be a memory device having a processor built in. The UIM may include, for example, a subscriber identity module (SIM), a universal integrated circuit card (UICC), a universal subscriber identity module (USIM), a removable user identity module (R-UIM), or any other smart card. The UIM may store information elements related to a mobile subscriber. In addition to the UIM, the mobile device may be equipped with memory. For example, the mobile device may include volatile memory 50, such as volatile Random Access Memory (RAM) including a cache area for the temporary storage of data. The mobile device may also include other non-volatile memory 52, which may be embedded and/or may be removable. The non-volatile memory may additionally or alternatively comprise an electrically erasable programmable read only memory (EE-PROM), flash memory or the like. The memories may store any of a number of pieces of information, and data, used by the mobile device to implement the functions of the mobile device. For example, the memories may include an identifier, such as an international mobile equipment identification (IMEI) code, capable of uniquely identifying the mobile device.

Figure 3:
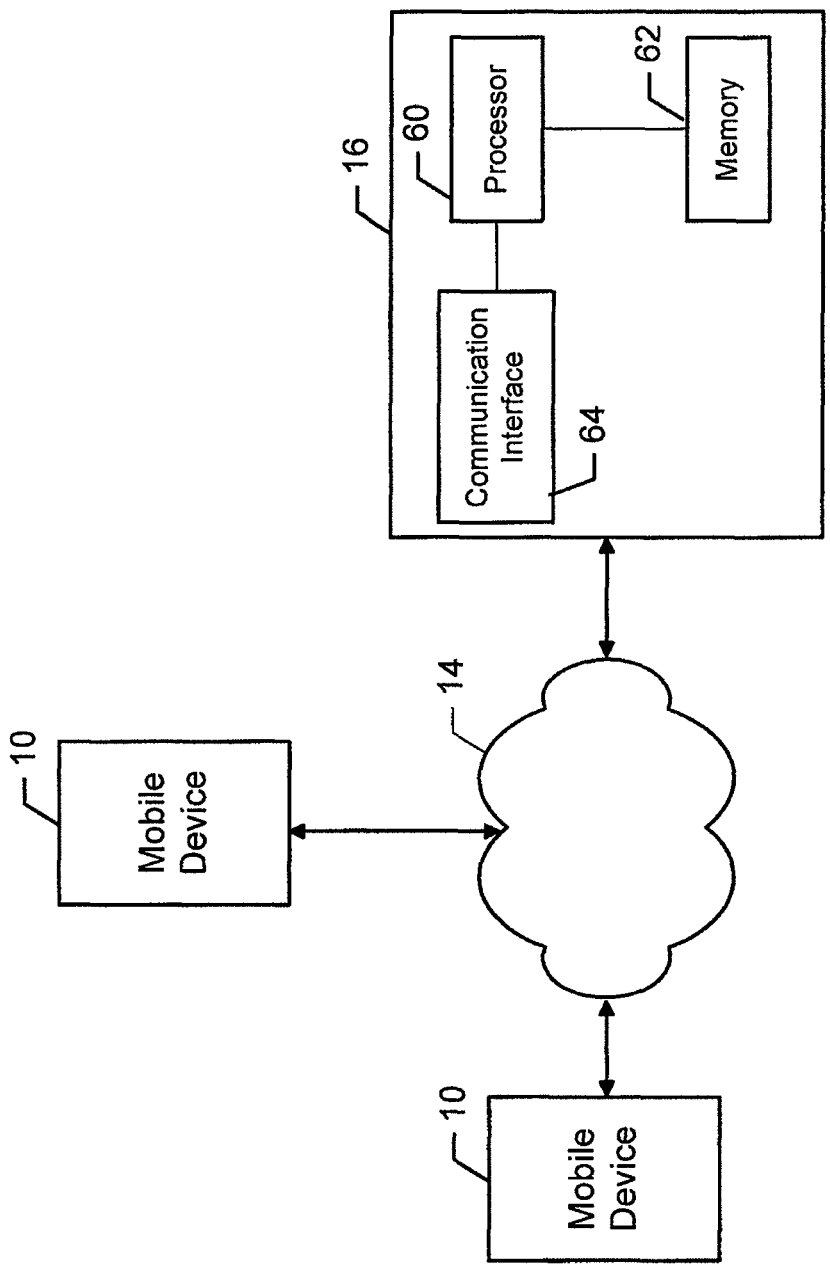
FIG. 3 is a schematic representation of a system for supporting embodiments of the present invention.

The mobile device 10 may be configured to communicate via a network 14 with a network entity 16, such as a server as shown in FIG. 3, for example. The network may be any type of wired and/or wireless network that is configured to support communications between various mobile devices and various network entities. For example, the network may include a collection of various different nodes, devices or functions such as the server, and may be in communication with each other via corresponding wired and/or wireless interfaces. Although not necessary, in some embodiments the network may be capable of supporting communications in accordance with any one of a number of first-generation (1G), second-generation (2G), 2.5G, third-generation (3G), 3.5G, 3.9G, fourth-generation (4G) level communication protocols, long-term evolution (LTE) and/or the like.

As described below, the server 16 may include or be associated with a database that may be accessible by a plurality of mobile devices 10 via the network 14. This database may maintain a plurality of predefined wireless fingerprints, such as previously observed wireless fingerprints (as used by way of example herein), in association with their respective, predefined geographical locations. Based upon an analysis of at least a subset of the information within the database, a mobile device may identify its current location by matching the current wireless fingerprint with a previously observed wireless fingerprint that is associated with a predefined geographical location. In one embodiment, the database is commonly accessible by a plurality of mobile devices. In another embodiment, the database is semi-private with the database only being accessible by a subset of mobile devices, such as the mobile devices of employees of a particular corporation, but not other mobile devices. In yet another embodiment, the database may be private with a mobile device only being able to access the wireless fingerprints that have been contributed by the respective mobile device. As shown in FIG. 3, a block diagram of a network entity 16 capable of operating as a server or the like is illustrated in accordance with one embodiment of the present invention. The network entity may include various means for performing one or more functions in accordance with embodiments of the present invention, including those more particularly shown and described herein. It should be understood, however, that the network entity may include alternative means for performing one or more like functions, without departing from the spirit and scope of the present invention.

In the illustrated embodiment, the network entity 16 includes means, such as a processor 60, for performing or controlling its various functions. The processor may be embodied in a number of different ways. For example, the processor may be embodied as various processing means such as processing circuitry, a coprocessor, a controller or various other processing devices including integrated circuits such as, for example, an ASIC, an FPGA, a hardware accelerator, and/or the like. In an example embodiment, the processor is configured to execute instructions stored in memory or otherwise accessible to the processor. As such, whether configured by hardware or software methods, or by a combination thereof, the processor 60 may represent an entity capable of performing operations according to embodiments of the present invention while specifically configured accordingly.

In one embodiment, the processor 60 is in communication with or includes memory 62, such as volatile and/or non-volatile memory that stores content, data or the like. For example, the memory may store content transmitted from, and/or received by, the network entity. Also for example, the memory may store software applications, instructions or the like for the processor to perform operations associated with operation of the network entity 16 in accordance with embodiments of the present invention. In particular, the memory may store software applications, instructions or the like for the processor to perform the operations described above and below with regard to FIG. 4. In one embodiment, the memory stores the database of previously observed wireless fingerprints in association with their respective, predefined geographical locations.

In addition to the memory 62, the processor 60 may also be connected to at least one interface or other means for transmitting and/or receiving data, content or the like. In this regard, the interface(s) can include at least one communication interface 64 or other means for transmitting and/or receiving data, content or the like, such as between the network entity 16 and the mobile device 10 and/or between the network entity and the remainder of network 14.

Figure 4:
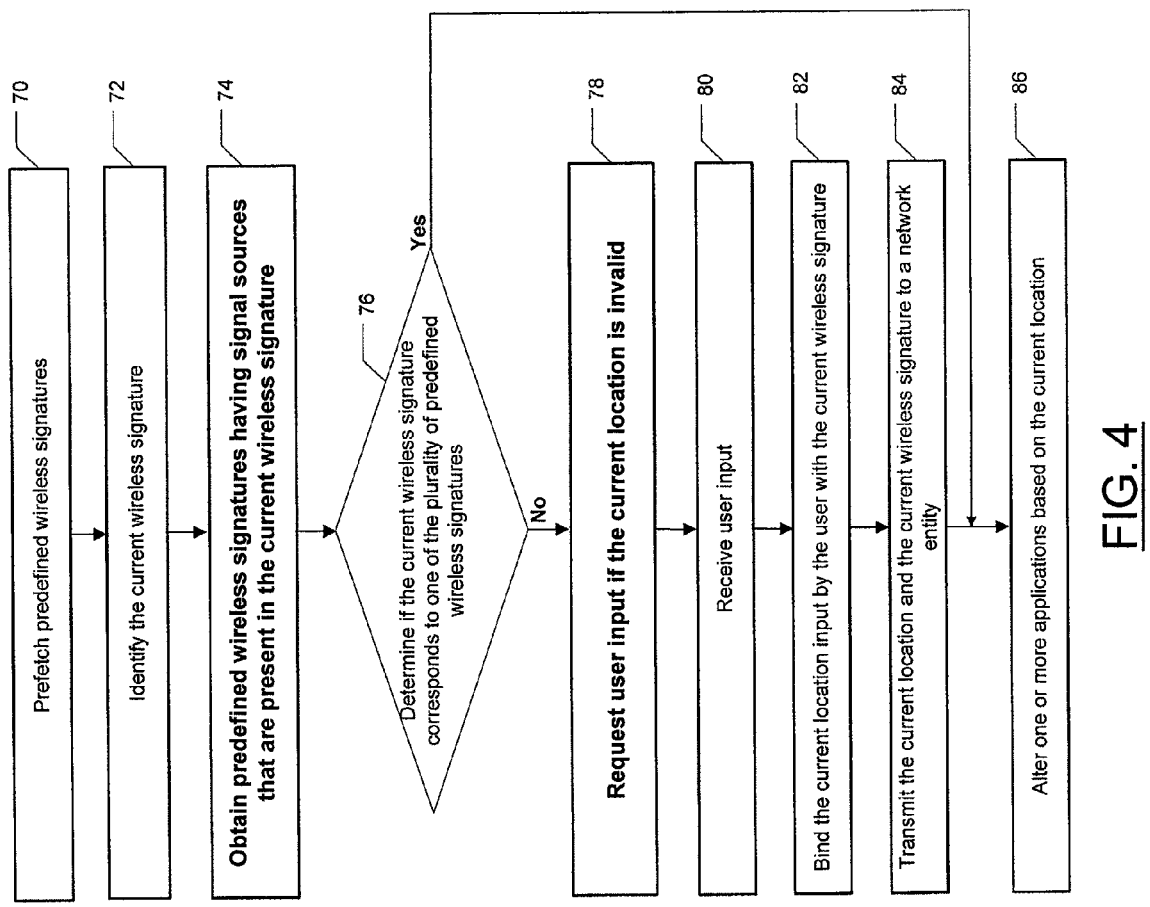
FIG. 4 is a flow chart of the operations performed in accordance with one embodiment of the present invention.

In order to determine its location in accordance with the embodiment depicted in FIG. 4, a mobile device 10 may identify the wireless signal present at its current geographical location. See operation 72. In order to identify the wireless fingerprint, the mobile device may scan for wireless signals, such as the wireless signals having a predetermined frequency or within a predetermined range of frequencies. In one embodiment, for example, the processor 30 directs the receiver 26 to capture incoming wireless signals with the receiver itself being configured to receive signals having a predefined frequency or within a range of predefined frequencies. In one embodiment in which the access points 12 of a wireless local area network have been deployed throughout a building such that the wireless fingerprint will be comprised of the wireless signals emitted by the access points, the mobile device may be configured to detect the wireless signals incident at the mobile device at the operational frequency of the access points. Alternatively, in embodiments in which other types of sources are employed that emit wireless signals at other frequencies, the mobile device may be similarly configured to detect wireless signals at the other frequencies of interest.

The wireless fingerprint that is identified by the mobile device 10 may include the received signal strength or other signal parameter for the wireless signals received from each access point in association with the address, such as the media access control (MAC) address, of each access point. With reference to the embodiment of FIG. 5, for example, four signal sources 12, such as four access points, are positioned throughout a portion of a building. Each access point of this embodiment has a unique address, such as 0xa3b, 0x6d2, 0xbc4, and 0x5fe.

Figure 5:
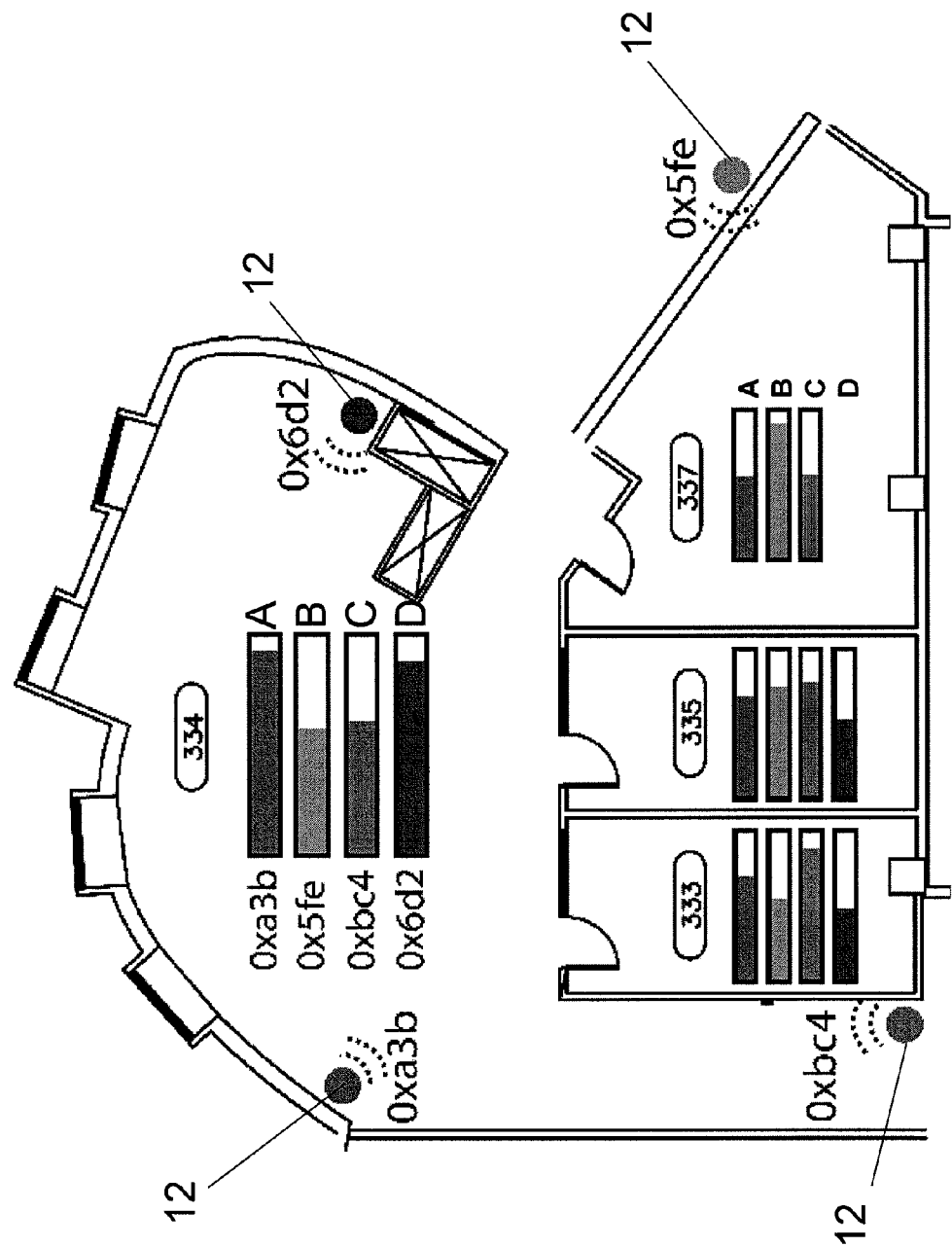
FIG. 5 is a schematic representation of the wireless fingerprints in each of four different spaces.

Because each room or space is differently situated with respect to the signal sources 12, both in terms of distance and in terms of intervening structures, such as walls, doors, windows and the like, the wireless fingerprint received by a mobile device 10 within each space is generally different as shown, for example, in FIG. 5. By associating a particular wireless fingerprint with a specific space, the space in which a mobile device is currently located may be identified by matching the current wireless fingerprint received by the mobile device with the particular wireless fingerprint associated with the space. The first space or region 334 has a fingerprint corresponding to the signal strengths of 0xa3b, 0x5fe, 0xbc4, and 0x6d2, which are identifiers of the four signals available in the illustrated spaces, also identified by (A), (B), (C), and (D) for ease of reference. Each of the signals has a different strength as represented by the corresponding horizontal bars. Each of spaces 333, 335, and 337 also have their own fingerprints with the four signal strengths corresponding to the four signals available. Region 337 shows signal strengths A, B, and C as the strength of signal D is negligible in that particular space. A database of existing wireless fingerprints may be generated through an initial site survey that builds and populates a signal strength map and produces fingerprints of each space. Fingerprints of a particular space may change over time based on reconfiguration, repositioning or replacement of the access points from which the signals are measured for the fingerprints.

As such, after identifying the wireless fingerprint present at a particular geographical location, the mobile device 10 and, more specifically, the processor 30 of one embodiment determines whether the current wireless fingerprint corresponds to a previously observed wireless fingerprint associated with a predefined geographical location and, if so, determines the predefined geographical location to be the current location. See operation 76 of FIG. 4. As such, the current wireless fingerprint identified by the mobile device may be compared to a plurality of previously observed wireless fingerprints, such as maintained in a database, to determine if the requisite correspondence exists. This fingerprint selection may be performed using Bayesian localization. Although the mobile device could transmit a representation of the current wireless fingerprint to a network entity 16 with a request that the server determine whether the current wireless fingerprint corresponds to any previously observed wireless fingerprint stored in a database maintained or otherwise accessible by the network entity, this reliance upon the network entity could undesirably introduce latency. As such, the mobile device, in one embodiment, stores a number of previously observed wireless fingerprints in association with respective predefined geographical locations in local memory, such as volatile memory 50.

The mobile device 10 may obtain the plurality of previously observed wireless fingerprints in a variety of manners. In one embodiment, a network entity 16 maintains a database, such as in memory 62, of previously observed wireless fingerprints for respective predefined geographical locations for use by a plurality of mobile devices. As such, the mobile device may communicate with the network entity to obtain a potentially relevant subset of the data from the database pairing previously observed wireless fingerprints to respective predefined geographical locations. The potentially relevant subset of data may be defined in various manners. In one embodiment, in instances in which the processor 30 determines that the previously observed wireless fingerprints that are locally stored by the mobile device fail to include any previously observed fingerprint that incorporates one or more of the signal sources that are present in the current wireless fingerprint, the mobile device provides a network entity with the address of each signal source that is present in the current wireless fingerprint. The network entity may then identify each previously observed wireless fingerprint stored in the associated database that includes any of the signal sources present in the current wireless fingerprint and may then provide each of these previously observed wireless fingerprints and the associated predefined geographical locations to the mobile device. Another embodiment may include previously observed fingerprints that are within the same Voronoi-based diagram that may represent a floor of a building, as will be further discussed below. See operation 74 of FIG. 4. In order to avoid latency introduced by the retrieval of data from the network entity once the current wireless fingerprint has been identified, the mobile device may optionally pre-fetch the data as shown in operation 70 of FIG. 4. In this embodiment, the mobile device provides the network entity with an estimate of its current location, such as the most recent location at which the mobile device was determined to be. The network entity of this embodiment then identifies and provides to the mobile device all of the wireless fingerprints that are associated with respective predefined geographical locations that are within a predefined distance of the estimate of the mobile device's current location.

The mobile device 10 and, in particular, the processor 30 of the mobile device may then determine whether the current wireless fingerprint corresponds to any one of the previously observed wireless fingerprints. See operation 76. In one embodiment, the processor determines whether the current wireless fingerprint matches a previously observed wireless fingerprint and, if so, determines a confidence level associated with a potential match with the current wireless fingerprint only being considered to correspond to a previously observed wireless fingerprint if the confidence level associated with the potential match satisfies a predefined threshold. With respect to the determination of whether the current wireless fingerprint corresponds to a previously observed wireless fingerprint, such as by matching a previously observed wireless fingerprint and having an appropriate confidence level, the processor may employ any of a variety of conventional techniques.

In one embodiment, the processor 30 utilizes negative information in conjunction with the determination as to whether the current wireless fingerprint corresponds to any one of the previously observed wireless fingerprints. For example, if the previously observed wireless fingerprint for space A includes signals from signal sources 1, 2 and 3 and the previously observed wireless fingerprint for space B includes signals from signal sources 1 and 2, with the signals from signal sources 1 and 2 being the same within spaces A and B, the processor may use the absence of signals from signal source 3 (e.g., negative information) in the current wireless fingerprint to determine that the current wireless fingerprint corresponds to the previously observed wireless fingerprint for space B. As such, negative information regarding which signal source(s) cannot be seen in a particular space may assist in the determination of the current location, such as by "breaking ties" with other spaces in which the signal source (s) may be seen and which otherwise have a comparable or the same fingerprint for the other signal sources.

In this embodiment, if the processor 30 identifies one of the previously observed wireless fingerprints to correspond to the current wireless fingerprint, the predefined geographical location associated with the previously observed wireless fingerprint that matches the current wireless fingerprint is determined by the processor to be the current location of the mobile device 10. Additionally, the mobile device and, in particular, the processor may modify the configuration and/or execution of one or more applications to take into account the current location of the mobile device. See operation 86.

Since deployment and maintenance of fingerprint-based localization may be labor and cost intensive, a user-generated or organic localization may be employed. Organic localization may replace the initial, comprehensive site survey of fingerprint-based localization with on-the-fly collection by individual users. Rather than the separate and distinct "survey" and "use" phases of typical fingerprint-based localization, organic localization merges the "survey" and "use" phases into a single phase, where users themselves are prompted to construct the signal-strength map for a building. After a small number of early users populate the map for a building, the typical general-case user may enjoy high-quality background location discovery with minimal individual effort.

Example embodiments of the present invention may use a user-generated localization system with client software running on each user's device, such as user device 10, which periodically gathers a fingerprint of nearby wireless sources. Each of these device fingerprints may be a union of scans, i.e., the signal strengths observed for each access point during a few consecutive seconds. This fingerprint may be checked against a locally-maintained space fingerprint cache, which may be populated asynchronously from a shared server, for example, server 16 of FIG. 3. If a confident match still cannot be found after fetching any cache misses, the software may request the user to select his or her current location from a map. This on-the-fly surveying binds the current user fingerprint to the space. Each addition to the signal-strength map may soon be reflected globally, resulting in improved localization for all users.

As described above, the mobile device 10 may query the user, such as via a question posed via the display 38, regarding the current location. While the mobile device may be configured to receive user input of the current location in various manners including free text entry of the name of the room, the room number or the like, the mobile device of one embodiment presents an image of a floor plan of the building via the display and permits the user to select one of the rooms from the floor plan as the room in which the mobile device is currently located. As such, images of the floor plan may be stored in memory, such as volatile memory 50, and may be accessible by the processor 30 for presentation upon the display in conjunction with a request for the user to enter their current location. In instances in which the processor has an estimated location, such as based upon the signal sources present in the current wireless fingerprint and/or based upon a recent location of the mobile device, the processor may display only a portion of the floor plan that includes and surrounds the estimated location, according to some embodiments, for example, on display 38 of the user device 10. In this embodiment, however, the user may scroll to other portions of the floor plan or jump to the floor plan of other floors, if so desired. Although the processor may simply direct that the floor plan or a portion of the floor plan to be displayed, the processor of one embodiment may highlight or otherwise identify the space selected by the user as a current location, the space that was independently determined to be the current location based upon a comparison with the previously observed wireless fingerprints and/or those spaces for which data exists or has been downloaded to the mobile device.

Example embodiments of the present invention may run primarily as a daemon process and be able to continue to function without manual input to a large degree. As users may be reporting locations to the server or device storing location fingerprints, it may be possible for a user to supply inaccurate or incorrect information to the server regarding the fingerprint of a particular space. As the localization system may run primarily in the background of a user device, such as 10, users may not be inclined to notice positioning errors and thus, embodiments of the present invention may determine when explicit correction to a fingerprint is required by a human. In order to minimize user error in reporting location, a map may be provided to the user when they are in an unrecognized location. In one example embodiment, the display 38 of the user device 10 may present a map to a user. This map may not need to be exact, though it may be desirable that the map provides a sufficient representation of location such that a user may convey their position with a desired degree of accuracy. A map application may be run on the user device 10 to provide this representation of location.

Embodiments of the present invention may further include a server 16 that may receive updates from user devices and may transmit available fingerprints to user devices. Such a server may be made redundant and highly-available such that a user device may access the server from any location within the building or area employing the localization application. Devices may be able to continue to localize even when not in contact with a server as the devices may cache available fingerprints in a temporary memory.

Organically constructing a location system may also require a determination of when a user should be prompted for contribution to the system. Prompting too frequently may result in an irritated user, while prompting too infrequently may result in stale data and poor localization estimates. Embodiments of the present invention may include a method that prompts users more frequently in the initial stages of generating localization fingerprints for a building or area to be covered, and maintaining coverage sufficient to achieve high localization accuracy while minimizing user effort.

As localization estimates may be used by both users and software applications, it may not be sufficient to return a location and expect that a user will notice any error. When no user-visible signals are known to the localization system, the user may be prompted; however when there is a possibility that the user's location may resemble an existing fingerprint, a determination must be made as to whether to prompt the user for location input or to return the estimated location based on the available user-visible signals. Four states may be available within an example embodiment of a system employing an organic construction of a location system: a) True Positive—the localization system has correctly determined the user's space and does not prompt for input; b) False Positive—the localization system has correctly determined the user's space but does prompt for input; c) True Negative—the localization system is unsure of the user's location and does prompt for input; and d) False Negative—the localization system incorrectly determines the user's space and does not prompt for input. An example embodiment of a method of the present invention may maximize the True Positive states with the minimum number of True Negative states, while eliminating False Positives and False Negatives.

Figure 6:
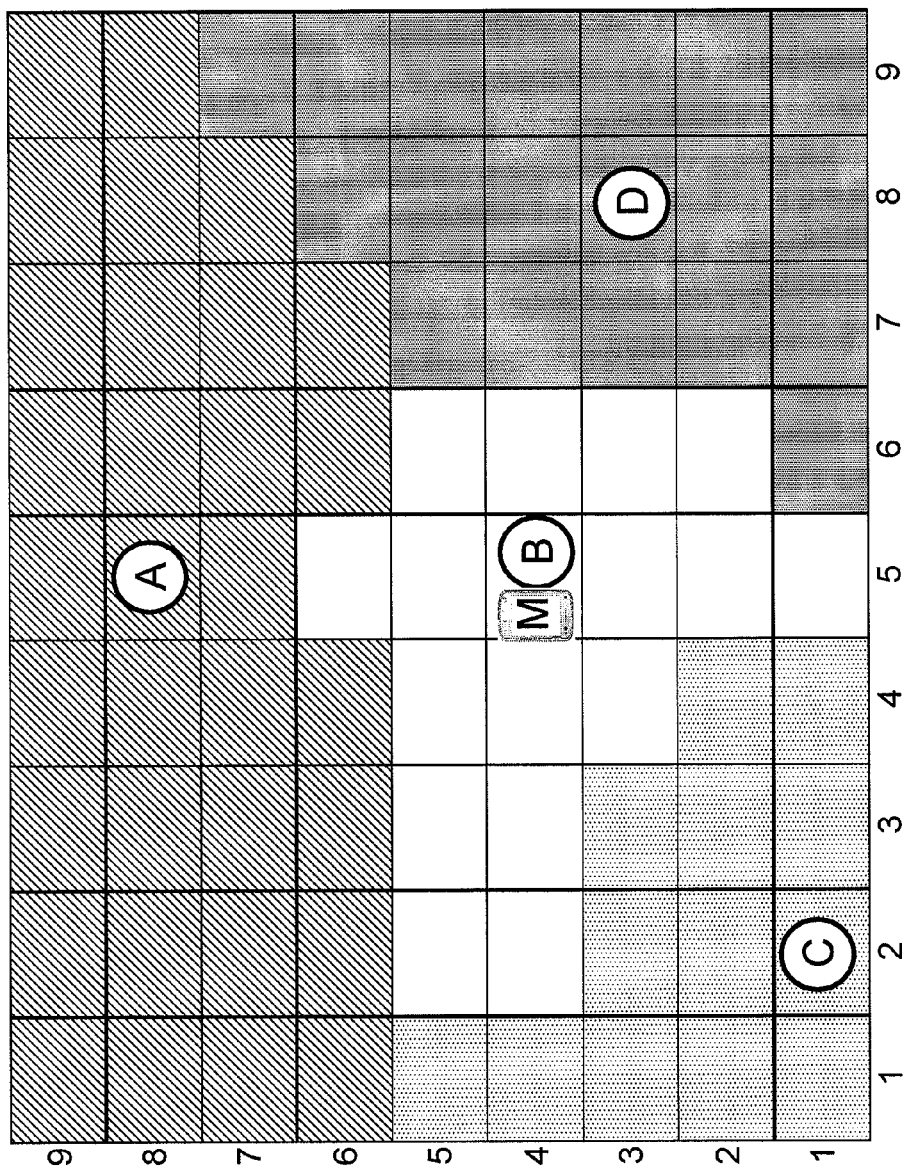
FIG. 6 is a schematic representation of a Voronoi diagram according to an example embodiment of the present invention.

Further example embodiments of the present invention may use Voronoi diagrams to determine when to prompt users for contributions. The example Voronoi diagram of FIG. 6 illustrates an artificial floor with 9×9 spaces and four bounded regions. Each Voronoi site is shown in a different shading pattern. In a standard, continuous two-dimensional Voronoi diagram, a set of points, called sites, exists on a plane. Creating a Voronoi diagram surrounds each cite with a cell such that all points closer to that site than to any other site are members of the cell. In a discrete Voronoi diagram, sites and non-sites are areas instead of points. The distance between them is defined in terms of the points within their respective areas: for example, as the Euclidean distance between their centroids. While the figure illustrates the use of a Euclidean distance function and Cartesian coordinates, other distance functions and coordinates could be used equivalently. Voronoi diagrams may be drawn on continuous space, wherein the area closest to each vertex, or site, is associated with its nearest site. A discrete Voronoi diagram denotes only a subset of vertices as sites while all other vertices are associated with the nearest sites. Voronoi diagrams may provide an intuitive method for determining uncertainty and conveying uncertainty to a user concerning bound spaces, or binds (i.e., spaces with known wireless fingerprints) and unbound spaces (i.e., spaces without known wireless fingerprints). Bound spaces are sites and unbound spaces become members of the cell of the nearest bound space. As a space shifts from being unbound to bound, it becomes a site and adds the closest unbound spaces to its newly-formed cell. The underlying intuition being that if a user is in an unbound space, the most likely space to be selected by the localizer is its Voronoi site. This is because the RF fingerprint of the unbound space is likely to be similar to the physically-nearby spaces. An organic localization system estimates position only as precisely as the nearest bind. This uncertainty may be conveyed to a user in various manners including through highlighting a border of a Voronoi region in which the user is estimated to be. The size of the Voronoi regions could be reduced automatically through the introduction of inferred, artificial fingerprints (e.g., the average between truly bound spaces). When a space or region transitions from being unbound to bound, the discrete Voronoi diagram may be updated.

In an example embodiment of the present invention, one Voronoi diagram is used per building floor such that updating the Voronoi diagram V of a floor may be an efficient operation, linear in the number of spaces v (vertices) of the floor. The Voronoi diagram may have v vertices and e edges between vertices, with each space sharing an edge with each topographically adjacent space. Each bound site (e.g., A, B, C, and D in FIG. 6) may store a list or a hash table of each space v that is a member of its region. The Voronoi diagram of a floor may be updated such that when a space is bound, that space is added to the Voronoi diagram and with the newly bound space being associated with those spaces closer to the newly bound space than to any other previously bound space. The term "closer" being defined by the distance metric of choice for the particular Voronoi diagram.

Figure 7:
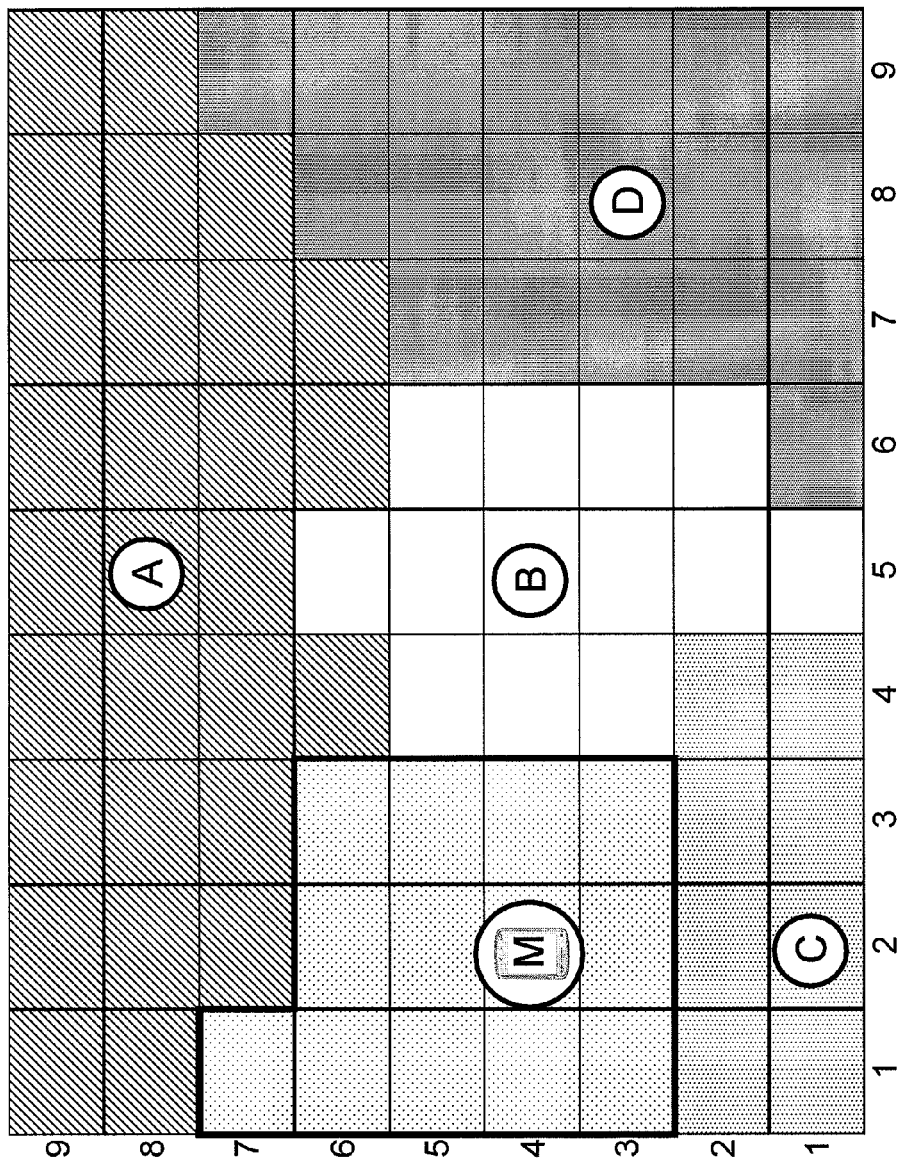
FIG. 7 is a schematic representation of a Voronoi diagram according to another example embodiment of the present invention.

An example embodiment of a method of organically constructing a localization system may be illustrated, for example, in FIG. 6, in which a user device M may be present within the area defined by the Voronoi diagram. The user device may be a mobile device, such as 10 of FIG. 2, with a display 38 presenting the Voronoi diagram of FIG. 6 to the user. The Voronoi diagram may show the estimated location of the user device M as within the bound space of B, thus, the border of B may be highlighted to represent the area. A user of the user device M may be requested to provide a user-defined location. In the embodiment of FIG. 6, the user device M is shown to be estimated at space (5,4) which is within the bound space of B. Any space within the region bound by B may be estimated to be at space (5,4) since that is the bind from which the region was defined. The user may know that they are actually in space (2,4), and enter the space (2,4) as their user-defined location. This information may be transmitted to a server that contains the information regarding bound and un-bound spaces. The server may then update the Voronoi diagram of FIG. 6 to resemble the Voronoi diagram of FIG. 7, which illustrates a new bind of M and a new bound region of M. As noted above, the space bound by M may include all spaces that are closer to M than they are to another bound space. As can be seen from the illustrated Voronoi diagram, as additional spaces are bound by user devices organically, the Voronoi diagram becomes more accurate and user devices may know their position more accurately. An example method of organically populating the Voronoi diagram of FIG. 7 may be configured to request a user-defined location only when a user is estimated to be in a bound space that is larger than a pre-defined area, for example eight individual spaces. Thus, a user may be requested to provide a user defined location if the user is estimated to be in the region bound by D, but not request a user-defined location if the user is estimated to be in the region bound by C. Other methods of determining when to request a user-defined location may be implemented including the total number of binds within the region among others.

Figure 8:
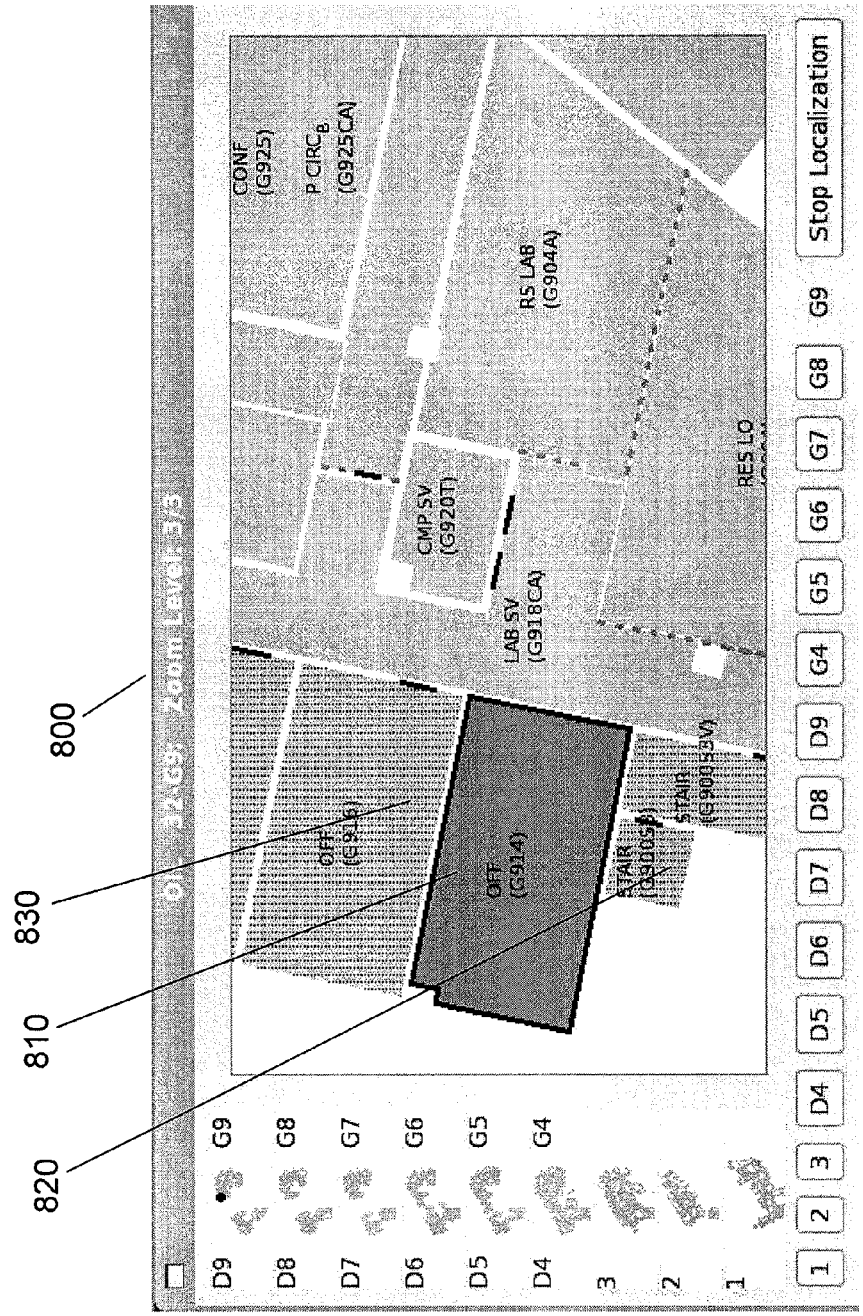
FIG. 8 is a schematic representation of a Voronoi diagram as it may be presented to a user on a display according to an example embodiment of the present invention.

Spatial uncertainty may be conveyed as illustrated in the example embodiment of FIG. 8 which illustrates an example of a Voronoi diagram as it may be displayed on a user device, wherein the user is shown in the bound space 810—acting as the Voronoi site—together with its cell. The user interface may convey the spatial uncertainty region by stippling the spaces in the region 820, 830. This may help non-contributing users understand the precision of the estimate and help contributing users know which binds would improve the database. If a user is in a bound space, but unbound spaces surround it, a localizer's prediction that the user is in the bound space should have low confidence, as the actual location may be one of the yet unbound surrounding spaces. The Voronoi cell surrounding the bound space may naturally capture this spatial uncertainty. As illustrated in FIG. 8, the cell, together with the site are both shown to the user.

In an example embodiment of the present invention, let L denote the set of all locations in a given floor, and P be the set of bound locations. Let $L_c$ and $P_c$ be sets of centroid coordinates of L and P, respectively. The Voronoi diagram Vor(Pc) is a planar subdivision of $R^2$ in which every point x in the plane is assigned to $p_c \in P_c$ if $d(x, p_c) \leq d(x, p'_c)$ $\forall p'_c \in P, p'_c \neq p_c$. The set of points that are assigned to $p_c$ is noted as $V(p_c)$, the Voronoi cell of $p_c$.

For every bound location $p \in P$, we define a spatial uncertainty region, U(p) to be a subset of L, as follows: every location $l \in L$ is assigned to one of the uncertainty regions, U(p), if the Euclidean distance from its centroid $l_c$ is smaller to $p_c$ than to any other $p'_c \in P_c$; equivalently, $l_c$ belongs to the Voronoi region of $p_c$, $l_c \in V(p_c)$. In essence, a Voronoi diagram may be approximated by spatial uncertainty regions using centroidal distances between locations. Two spatial uncertainty metrics may include the number of bound locations denoted as n(p) and the effective uncertainty radius, defined as $$r(p) = \max_{l_c \in V(p_c)} d(p_c, l_c).$$

An algorithm may be used to determine when to prompt a user for location when the location estimate is stable. In the algorithm, $C_s^{max}$ and $C_i^{max}$ are thresholds to determine the stability or lack thereof for the location estimate. n* is a pre-defined threshold for spatial uncertainty.

```
1: Input: location estimate, l uncertainty region U(l)
2: Output: prompt = { true, false }
3: States: stability counter C_s , instability counter C_i , previous
   location estimate l_p
4: Initialization: C_s ← 0, C_i ← 0, l_p ← Nil
5:
6: if l_p = Nil then
7:   l_p ← l , prompt ← false, return
8: else
9:   if l_p = l then
10:      C_s ← C_s + 1, C_i ← max{C_i −1, 0}
11:  else
12:      C_i ← C_i + 1, C_s ← max{C_s −1, 0}
13:  end if
14:  if C_s > C_s^max and n(l) > n * then
15:      prompt ← true, C_s ← 0, C_i ← 0
16:  else if C_i > C_i^max then
17:      prompt ← true, C_s ← 0, C_i ← 0
18:  else
19:      prompt ← false, l_p ← l
20:  end if
21: end if
22: return
```

This algorithm may improve coverage and accuracy by having the user device monitor a pair of hypothesis on whether contributing user input to the system can improve the fingerprint database. Specifically, each time a location estimate is produced, the device may evaluate: 1) if the user creates a bind to a nearby location, will the coverage of the system be increased while minimizing processing burden? and 2) if the user creates a bind to the user's current location, will the accuracy of the system for this location be increased while minimizing processing burden? The first question may be answered by considering the spatial uncertainty of the current location estimate while the second question may be answered by checking whether recent location estimates for the user's location have been stable or not.

A fingerprint for a space may be derived from any number of signals that are detected in the space and in some cases the number of available signals is large, such that a fingerprint generated with all available signals may prove very similar to a fingerprint generated at an adjacent space. The large number of available signals may muddy the fingerprint of the space such that it is less distinct than desirable by obscuring the fingerprint with too many signals. Similarly, if a large number of binds are in proximity to a space for which a fingerprint is desired, that fingerprint may be muddied or rendered unclear and less unique by the large number of binds. It may be desirable to limit the number of binds or signals that comprise the fingerprint of a space. A preferred fingerprint may be one that includes valid, non-erroneous binds or fingerprints that are sufficiently different from those included in the fingerprints of adjacent or near-by spaces. This may allow spaces that are immediately adjacent to one another to be easily recognized as distinct spaces.

Example embodiments of the present invention may include a heuristic that continuously refines fingerprints to maintain an accurate localization system. Let d define the current average signal distance to the nearest neighbors topologically for a given bound space s. When adding a new bound space b to the Voronoi diagram, if d is decreased, the new bound space b is discarded from the fingerprint of s. If adding the new bound space b to the Voronoi diagram increases d (i.e., makes the fingerprint clearer or more defined), a bound space already-in-use in the fingerprint of s may be removed, preferably beginning with the binds that result in the greatest fingerprint differentiation. Additional binds used in the fingerprint may also be removed from the fingerprint of s until the d stops decreasing. Using this method may result in no binds being removed from the fingerprint of s.

The manner in which a wireless fingerprint represents the signal strength associated with each signal source may take into account the potential of a wireless fingerprint to vary somewhat based upon various parameters. In this regard, although the signal strength of the signals transmitted by each signal source visible within a space may be represented in various manners, the signal strength is represented in one embodiment by its received signal strength indication (RSSI), although other measures may be alternatively employed, such as signal to noise ratio (SNR). The RSSI values may be normalized or scaled so as to lie within a predefined range, such as 0 to 100. For each space and for each signal source visible within the space, the processor 30 of one embodiment constructs a histogram of the number (i.e., count) of signals received within the space from the respective signal source having respective RSSIs. In this embodiment and in recognition of the potential of the wireless fingerprint to vary somewhat over time, the reception of a signal having a particular RSSI will be reflected not only in the count associated with the particular RSSI, but also in the counts of the RSSIs proximate to the particular RSSI. For example, instead of merely incrementing the count associated with a RSSI of six in response to detecting a signal within the space from the respective signal source having a RSSI of 6, the count associated with an RSSI of 6 may be increased by a predefined amount, such as 0.8, the counts associated with the immediately-adjacent RSSIs, such as RSSIs of 5 and 7, may be incremented by smaller predefined amounts, such as 0.075, and the counts associated with the RSSIs that are two removed from the particular RSSI, such as RSSIs of 4 and 8, may be incremented by an even smaller predefined amount, such as 0.025. By doing so, the histogram may be more smoothly contoured.

Figure 9:
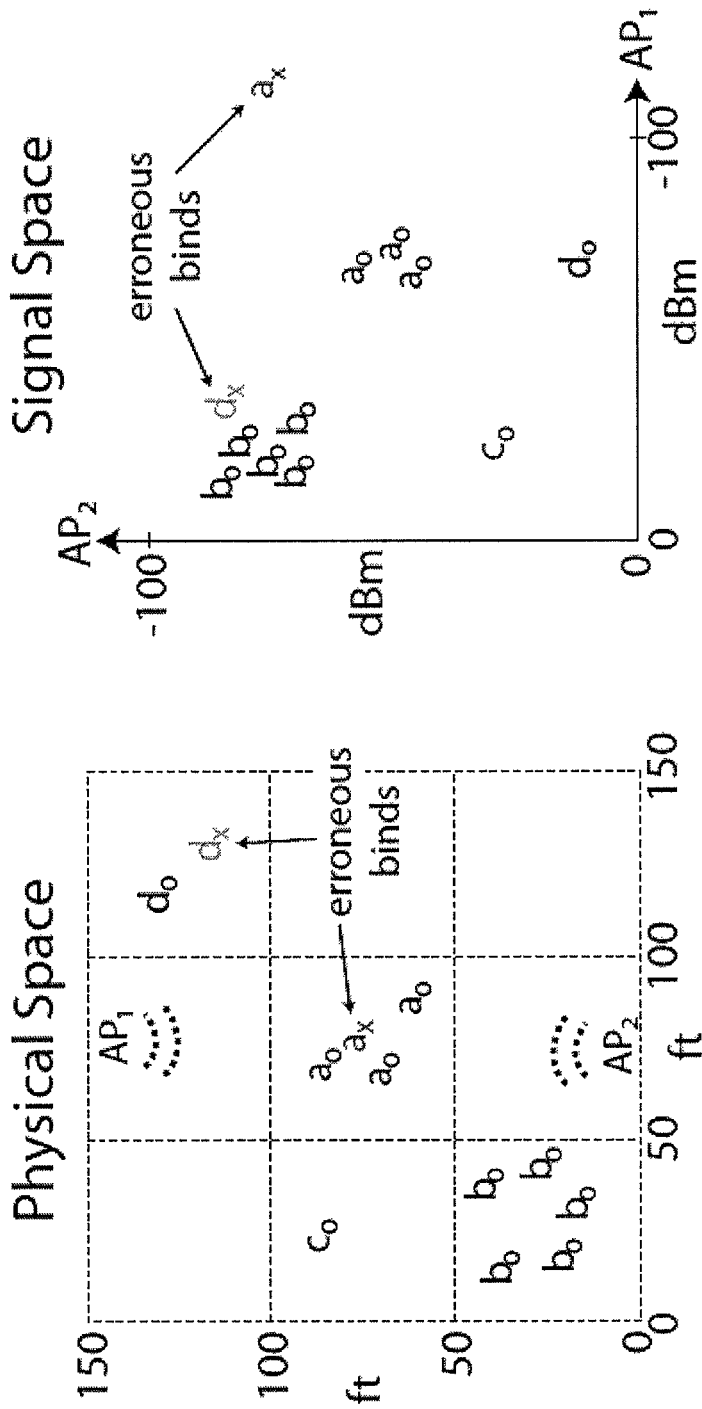
FIG. 9 is a graphical representation of clustering of binds according to an example embodiment of the present invention.

To maintain accuracy in the localization system, embodiments may employ a method that automatically discards erroneous user input through clustering. A user may not always select the correct location when "binding" a space. It is desirable to discard erroneous binds and differentiate between erroneous binds and true changes in the radio frequency (RF) environment due to access point addition, deletion, and movement. Binds or collections of RF scans from the same device recorded consecutively in time tend to cluster with other binds from the same space, as illustrated in FIG. 9. Correct binds that are made in the same physical space may tend to cluster in the signal space while outliers in the signal space may indicate erroneous binds. In FIG. 9, correct binds are denoted as $a_o$, $b_o$, $c_o$, and $d_o$ while erroneous binds are denoted by $a_x$, $b_x$, $c_x$, or $d_x$. Such clustering may occur in the per-access-point RF space. Each scan has a value along with each dimension where an access point was detected. The domain for each dimension may range from the maximum to the minimum detectable power range for the RSSI, such as from 0 to around −100 dBM. In order to supply each scan with a value on each dimension, dimensions where access points are not detected may be given the minimum low power value. Using scans as points in the RF space, clustering algorithms can be used to detect outliers: e.g., in the histogram described above, an outlier may fall outside of the curve anticipated by the histogram, possibly by a particular statistical measure. Outliers that occur for scans that were recorded in the same time window (for example, the same day), may tend to show erroneous binds. Applying the same method across time windows of different granularities may detect true changes in the RF environment. For each space, the current bind cluster may be compared with bind clusters from previous time windows. If the distance between the two clusters exceeds a threshold, the old cluster bind may be dropped as a change may be assumed in the RF environment. The bind cluster for the current time window may include scans that have been flagged as erroneous and background scanning that is done by a user device. When a user's location is determined, the scans of that device may be implicitly bound to the space in the current time window. Alternatively, the clustering may be performed continuously with the most recent binds given more weight than the older binds.

Algorithms that may be used for clustering, where k is the number of clusters, include:

Algorithm 1—Clustering Per Location Fingerprint
1. If there is only one bind, accept it.
2. If there is no neighbor location to compare to, accept all binds.
3. Otherwise,
4. Hierarchical clustering to group binds. (signal distance=Euclidean distance per effective dimension. Average signal distance, threshold=13 dB)
5. If the number of resulting cluster>1, pick the one whose sum of signal distance to neighbor locations is minimum.
6. Otherwise, accept all.

Algorithm 2—(Strawman) Majority Vote of k Nearest Neighbors
1. If there are fewer than k/2+1 binds in this location, accept.
2. If the total number of binds in the system is fewer than k+1, accept.
3. Otherwise, for every bind,
4. Pick k nearest neighbor across all fingerprints.

5. If the location of the majority of those k neighbors matches the current (claimed) location, take that bind.
6. Otherwise, discard it.

Figure 10:
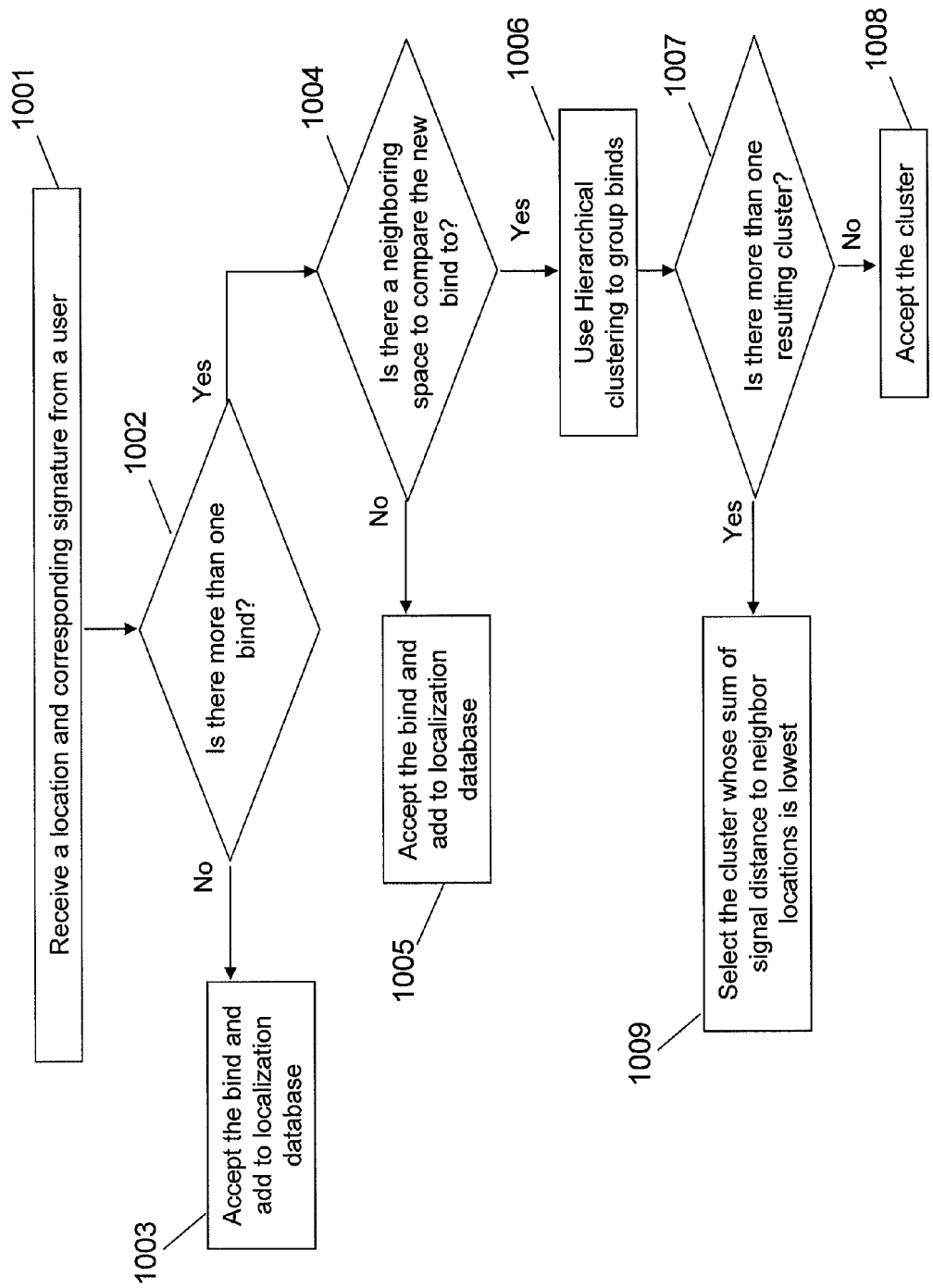
FIG. 10 is a flow chart of the operations performed in accordance with another embodiment of the present invention.

Algorithm 1 is illustrated in the flowchart of FIG. 10, wherein the localization system, for example, the server, receives a location and corresponding fingerprint from a user at block 1001. The location and corresponding fingerprint together constitute a bind. At block 1002, the method determines if more than one bind exists for the location. If not, the bind is accepted and added to the database for future reference at block 1003. If there is more than one bind for the location, the method then determines if there is a neighboring space to compare the new bind to at block 1004. If there is no neighboring space for comparison, the bind is accepted and added to the database at block 1005. If there is a neighboring space to compare the new bind to, hierarchical clustering may be used to group the binds at block 1006. At block 1007 the method determines if there is more than one resultant cluster and if so, the cluster with the lowest total signal distance to its neighboring locations is selected as the cluster to use at block 1009. If there is only one cluster, that cluster is added to the database at block 1008.

Figure 11:
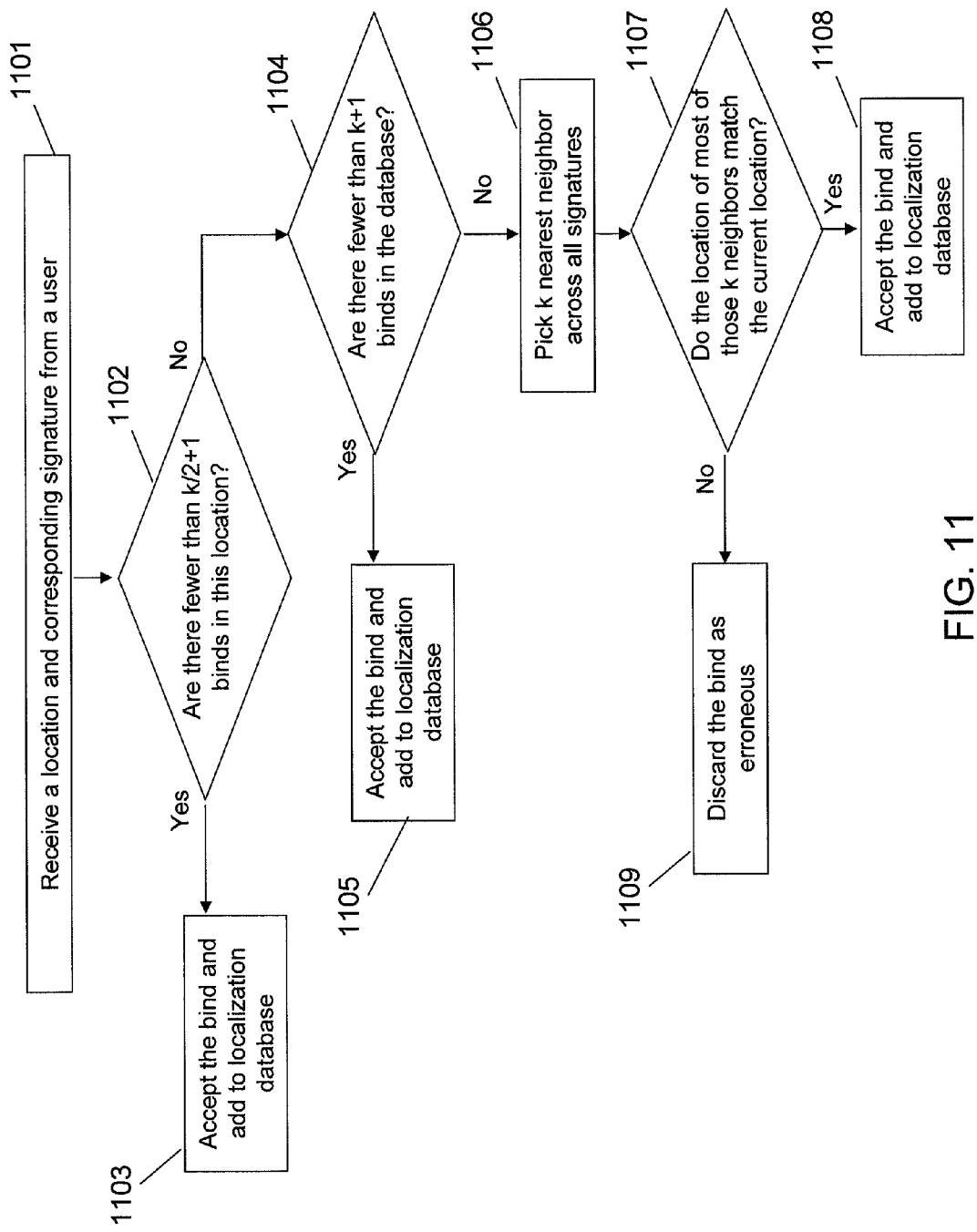
FIG. 11 is a flow chart of the operations performed in accordance with a further embodiment of the present invention.

Algorithm 2 is illustrated in the flowchart of FIG. 11, wherein the method receives a location and corresponding fingerprint from a user at block 1101. At block 1102, a determination is made as to whether there are fewer than k/2+1 binds in the database for the present location of the user. If there are fewer than k/2+1 binds, the new bind is accepted and added to the database at block 1103. If there are k/2+1 binds or more, the method then determines if there are fewer than k+1 binds in the database at block 1104. If there are fewer than k+1 binds, the new bind is accepted and added to the database at block 1105. If there are k+1 or more binds in the database, k nearest neighbors are selected across all fingerprints at block 1106. If the location of the majority of those neighbors match the current location, then the bind is accepted at block 1108. If the majority of the k neighbors do not match the current location, the bind is discarded as erroneous at block 1109.

In addition to attempting to determine the current location based upon a comparison of the current wireless fingerprint to a plurality of previously observed wireless fingerprints as described above, the method, apparatus and computer program product of embodiments of the present invention also request user input of the current location of the mobile device 10 in various instances in order not only to define the current location, but also to populate the database by associating the current wireless fingerprint detected by the mobile device with the current location provided by a user of the mobile device. The mobile device may solicit input from the user regarding the current location in various manners. For example, the mobile device and, more specifically, the processor 30 of one embodiment prompts the user, such as by means of a question presented via the display 38, to provide the current location of the mobile device in response (and, in one embodiment, only in response) to the failure of the processor to identify any previously observed wireless fingerprint that corresponds to the current wireless fingerprint, such as by failing to identify any previously observed wireless fingerprint that matches the current wireless fingerprint with a sufficient confidence level. See operation 78. In instances in which the user responds to the prompt by providing an indication of the current location of a mobile device, the mobile device may also identify the current wireless fingerprint such that the current wireless fingerprint may be paired or bound to the current location provided by the user, along with a current timestamp. See operations 80 and 82 of FIG. 4. This pairing of the current location and the current wireless fingerprint may then be transmitted from the mobile device via the network 14 to the network entity 16 for inclusion in the database, thereby serving to further populate the database for the potential benefit of a number of users. See operation 84. As noted above, the mobile device and, in particular, the processor may also modify the configuration and/or execution of one or more applications to take into account the current location of the mobile device. See operation 86.

As described above, FIGS. 4, 10, and 11 are flowcharts of an apparatus, method and program product according to some exemplary embodiments of the invention. It will be understood that each block of the flowcharts, and combinations of blocks in the flowcharts, can be implemented by various means, such as hardware, firmware, and/or computer program product including one or more computer program instructions. For example, one or more of the procedures described above may be embodied by computer program instructions. In this regard, the computer program instructions which embody the procedures described above may be stored by a memory device of a mobile device 10, network entity such as a server 16 or other apparatus employing embodiments of the present invention and executed by a processor 30, 60 in the mobile device, server or other apparatus. In this regard, the operations described above in conjunction with the diagrams of FIGS. 4, 10, and 11 may have been described as being performed by the communications device and a network entity such as a server, but any or all of the operations may actually be performed by the respective processors of these entities, for example in response to computer program instructions executed by the respective processors. As will be appreciated, any such computer program instructions may be loaded onto a computer or other programmable apparatus (e.g., hardware) to produce a machine, such that the instructions which execute on the computer (e.g., via a processor) or other programmable apparatus implement the functions specified in the flowcharts block(s). These computer program instructions may also be stored in a computer-readable memory that can direct a computer (e.g., the processor or another computing device) or other apparatus to function in a particular manner, such that the instructions stored in the computer-readable memory produce an article of manufacture including instruction means which implement the functions specified in the flowcharts block(s). The computer program instructions may also be loaded onto a computer or other apparatus to cause a series of operations to be performed on the computer or other apparatus to produce a computer-implemented process such that the instructions which execute on the computer or other programmable apparatus provide operations for implementing the functions specified in the flowcharts block(s).

Accordingly, blocks of the flowcharts support combinations of means for performing the specified functions, combinations of operations for performing the specified functions and program instruction means for performing the specified functions. It will also be understood that one or more blocks of the flowcharts, and combinations of blocks in the flowcharts, can be implemented by special purpose hardware-based computer systems which perform the specified functions, operations, or combinations of special purpose hardware and computer instructions.

In an exemplary embodiment, an apparatus for performing the methods of FIGS. 4, 10 and/or 11 may include a processor (e.g., the processor(s) 30 and/or 60) configured to perform some or each of the operations (70-86, 1001-1009, and/or 1101-1109) described above. The processor(s) may, for example, be configured to perform the operations (70-86, 1001-1009, and/or 1101-1109) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 70-86, 1001-1009, and/or 1101-1109 may comprise, for example, the processor(s) 30 and/or 60 as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, although the mobile device 10 has been described as determining whether the wireless fingerprint corresponds to a previously observed wireless fingerprint, requesting and receiving an identification of the geographical location and associating the wireless fingerprint with the identification of the geographical location, a network entity 16, such as the server, may perform some or all of these operations and may then provide the current location to the mobile device for use, for example, in appropriately configuring and/or executing various applications. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving a new bound space that comprises an observed wireless fingerprint at a mobile apparatus and a corresponding geographical location for a given bound space;
determining whether to at least one of accept and decline the new bound space based upon the observed wireless fingerprint compared to previously measured wireless fingerprints and locations;
analyzing an average signal distance between the geographical location and a plurality of nearest neighbors that comprise existing bound spaces stored in a database wherein, when accepting the new bound space to a fingerprint of a current bound space for the mobile apparatus, an increase in the average signal distance improves the accuracy of the existing bound spaces stored in the database;
accepting the new bound space to the fingerprint of the current bound space for the mobile apparatus in an instance in which adding the new bind to the database increases the current average signal distance between the geographical location and the plurality of nearest neighbors that comprise existing bound spaces stored in the database;
declining the new bound space from the fingerprint of the current bound space for the mobile apparatus in an instance in which adding the new bind to the database decreases the current average signal distance between the geographical location and the plurality of nearest neighbors that comprise existing bound spaces stored in the database;
and failing to associate the new bind with the geographic location in response to declining the new bound space.

2. A method according to claim 1, wherein determining whether to at least one of accept and decline the new bound space comprises:
accepting the new bind in an instance in which the new bound space is the only bound space corresponding to the geographic location.

3. A method according to claim 1, wherein determining whether to at least one of accept and decline the new bind comprises:
hierarchical clustering to group the new bound space with existing bound spaces that correspond to the geographical location; and
accepting the new bound space if it is in the cluster whose sum of signal distance to neighbor locations is shortest in response to more than one cluster resulting from the hierarchical clustering.

4. A method according to claim 1, wherein determining whether to at least one of accept and decline the new bound space comprises:
determining wireless fingerprints from a plurality of spaces that neighbor the geographical location;
determining if the wireless fingerprints from the majority of the plurality of spaces that neighbor the geographical location match the wireless fingerprint of the new bound space; and
accepting the new bound space in response to the wireless fingerprints from the majority of the plurality of spaces that neighbor the geographical location matching the wireless fingerprint of the new bound space.

5. A method according to claim 1, wherein associating the new bound space with the geographic location comprises updating a Voronoi diagram such that any geographical locations that do not have an associated wireless fingerprint that are closer to the new bound space than to any existing bind are associated with the new bound space.

6. An apparatus comprising at least one processor and at least one memory including computer program code, the at least one memory and the computer program code configured to, with the at least one processor, cause the apparatus to:
receive a new bound space that comprises an observed wireless fingerprint at a mobile apparatus and a corresponding geographical location for a given bound space;
determine whether to at least one of accept and decline the new bound space based upon the observed wireless fingerprint compared to previously measured wireless fingerprints and locations;
analyze an average signal distance between the geographical location and a plurality of nearest neighbors that comprise existing bound spaces stored in a database wherein, when accepting the new bound space to a fingerprint of a current bound space for the mobile apparatus, an increase in the average signal distance improves the accuracy of the existing bound spaces stored in the database;
accept the new bound space to the fingerprint of the current bound space for the mobile apparatus in an instance in which adding the new bind to the database increases the current average signal distance between the geographical location and the plurality of nearest neighbors that comprise existing bound spaces stored in the database;

decline the new bound space from the fingerprint of the current bound space for the mobile apparatus in an instance in which adding the new bind to the database decreases the current average signal distance between the geographical location and the plurality of nearest neighbors that comprise existing bound spaces stored in the database; and fail to associate the new bind with the geographic location in response to declining the new bound space.

7. An apparatus according to claim 6, wherein determining whether to at least one of accept and decline the new bound space comprises accepting the new bound space in an instance in which the new bind is the only bound space corresponding to the geographic location.

8. An apparatus according to claim 6, wherein determining whether to at least one of accept and decline the new bound space comprises:

hierarchical clustering to group the new bound space with existing bound spaces that correspond to the geographical location; and accepting the new bound space if it is in the cluster whose sum of signal distance to neighbor locations is shortest in response to more than one cluster resulting from the hierarchical clustering.

9. An apparatus according to claim 6, wherein determining whether to at least one of accept and decline the new bound space comprises:

determining wireless fingerprints from a plurality of spaces that neighbor the geographical location;

determining if the wireless fingerprints from the majority of the plurality of spaces that neighbor the geographical location match the wireless fingerprint of the new bound space; and accepting the new bound space in response to the wireless fingerprints from the majority of the plurality of spaces that neighbor the geographical location matching the wireless fingerprint of the new bound space.

10. The method of claim 6, comprising:

receiving a request for a user device to provide a user-defined location;

providing for display of a representation of an estimated geographic location of the user device;

receiving a user-defined location;

providing for transmission of the user defined location;

wherein the representation of the estimated geographic location of the user device is at least a portion of a Voronoi diagram.

11. A method according to claim 10, wherein the Voronoi diagram includes a plurality of spaces.

12. A method according to claim 11, wherein the user-defined location is a space on the Voronoi diagram.

13. A method according to claim 12, wherein the Voronoi diagram is updated to include the user-defined location as a new bound space in a new bound region.

14. A method according to claim 13, wherein the new bound region includes spaces proximate the new bound space that are closer to the new bound space than they are to an existing bound space.

15. A method according to claim 10, wherein the request is generated by the user device.

* * * * *